United States Patent [19]

van der Werf et al.

[11] Patent Number: 4,717,457
[45] Date of Patent: Jan. 5, 1988

[54] METHOD OF PROVIDING A TRANSPARENT LAYER ON A SUBSTRATE

[75] Inventors: Pieter van der Werf; Albertus Versteyne, both of Eindhoven, Netherlands

[73] Assignee: U.S. Philips Corporation, New York, N.Y.

[21] Appl. No.: 647,247

[22] Filed: Sep. 4, 1984

[30] Foreign Application Priority Data

Sep. 15, 1983 [NL] Netherlands ............ 8303183

[51] Int. Cl.$^4$ .................. C23C 28/00; C25D 11/04
[52] U.S. Cl. .................. 428/701; 204/38.3; 204/42; 428/432; 428/469
[58] Field of Search .......... 148/6.27; 204/37.6, 204/38.3, 42; 428/633, 432, 469, 701

[56] References Cited

U.S. PATENT DOCUMENTS

| | | | |
|---|---|---|---|
| 3,882,000 | 5/1975 | Swartz et al. | 204/37.6 |
| 3,941,630 | 3/1976 | Larrabee | 204/38.3 |
| 3,961,962 | 6/1976 | Sato | 204/38.3 |
| 3,982,265 | 9/1976 | Johnston, Jr. | 204/42 |
| 4,108,736 | 8/1978 | Rigo et al. | 204/38.3 |
| 4,190,321 | 2/1980 | Dorer et al. | 350/165 |

FOREIGN PATENT DOCUMENTS

0104686  6/1982  Japan ................. 204/37.6

Primary Examiner—John F. Niebling
Assistant Examiner—W. T. Leader
Attorney, Agent, or Firm—Norman N. Spain

[57] ABSTRACT

A method of providing a transparent layer of aluminum oxide or a layer stack of aluminum oxide and one or more other metal oxides on a substrate by providing the Al and optionally the other metals on the substrate and then oxidizing the assembly electrolytically is shown in which a conductive layer of tin oxide and indium oxide and/or cadmium oxide, if necessary doped to increase the conductivity, is provided between the Al and the substrate. As a result of this the Al is converted completely into oxide so that an optical transmission is obtained which is as high as possible.

4 Claims, No Drawings

METHOD OF PROVIDING A TRANSPARENT LAYER ON A SUBSTRATE

BACKGROUND OF THE INVENTION

The invention relates to a method of providing a transparent coating comprising an aluminum oxide layer on a substrate and of providing a stack of layers the lowermost layer of which consists of aluminum oxide.

A method of providing such metal oxide layers, and including oxides other than that of aluminum according to which first a layer of the relevant metal is provided and the metal is then chemically converted into the relevant metal oxide, is known from German Patent Specification No. 757 763. A similar method is known from U.S. Pat. No. 4,190,321 in which the conversion of the metal into the metal oxide is produced electrochemically.

This type of layer or stack of layers, preferably in a thickness of a quarter of the wavelength of the visible light, for example 550 nm, is often used to reduce reflection. Aluminum oxide is frequently used for this purpose. The above-described method in which the conversion of metal into oxide is produced electrolytically, however, has the disadvantage for aluminum that the aluminum cannot be converted completely into the aluminum oxide. On the inside of the layer a zone of the metal is not converted into the oxide and this results in absorption or scattering taking place at the non-converted metal.

This disadvantage in the use of aluminum the presence of the unconverted metal was disclosed in U.S. Pat. No. 4,190,321. According to this Patent this disadvantage can be obviated by keeping the layer, after the electrolytic oxidation, in contact with a dilute solution of sodium chlorite at 80° C. for 10 minutes.

BRIEF SUMMARY OF THE INVENTION

The invention provides a simple solution to this problem.

The method of manufacturing a transparent coating comprising an aluminum oxide layer on a substrate, in which method an aluminum layer is provided on the substrate and the layer is then converted electrolytically into aluminum oxide, is characterized according to the invention in that the surface layer of the substrate upon which the aluminum is provided consists of a transparent electrically conductive layer of one or more oxides of one or more of the group of metals consisting of tin, indium and cadmium, doped if necessary to increase the electrical conductivity of the electrically conductive layer.

DETAILED DESCRIPTION OF THE INVENTION

This layer can be formed at the substrate surface by conversion of a hydrolyzable compound of the metal or metals in question by water vapour at the heated substrate surface or by pyrolysis of such a metal compound or compounds. Glass, metal or a synthetic resin may be employed as the substrate. The layer may also be provided by sputtering or vapor deposition. The layer must be sufficiently electrically conductive so as to make it possible to convert the superposed metal layer or metal layers electrolytically into the oxide or the oxides, respectively. This can be established experimentally.

The aluminum can be provided on said substrate by sputtering, vapour deposition or by electrodeposition from a non-aqueous solution, for example, according to U.S. Pat. No. 4,379,030. In the last-mentioned modified embodiment, the advantage exists, at least as regards the aluminum oxide, that the method is performed entirely electrolytically.

The aluminum is then converted anodically entirely into aluminum oxide in electrolyte solutions which are known per se for this purpose, for example, such as solutions of of sulphuric acid or oxalic acid.

It is also possible to use the method according to the invention for the manufacture of a stack of layers, by alternating the aluminum layer with other layers, for example, Ti or Nb. After the completion of the stack, the stack is oxidized electrolytically in one operation.

A specific embodiment will now be described in greater detail.

A layer having a thickness of 140 nm of a mixture of indium oxide and tin oxide in the mol ratio 90:10 is provided on a glass substrate by means of vapor deposition. A layer of aluminum having a thickness of 85 nm is provided on the layer of these oxides by sputtering.

The substrate is then connected anodically in an aqueous anodizing solution containing 50 g of oxalic acid per liter of solution and is then subjected to the electrolysis process for 30 minutes at room temperature with a current density of 50 mA/dm$^2$.

After rinsing and drying, the substrate comprising the layers of indium oxide and tin oxide, an aluminum oxide layer having a thickness of approximately $\frac{1}{4}\lambda$ for 550 nm is obtained.

In this experiment the Al$_2$O$_3$ layer on the $\frac{1}{4}\lambda$ layer of indium oxide-tin oxide acts as a two layer anti-reflective coating, the reflection of which at 530 nm decreases from 4.1 to 0.8% as a result of the oxidation treatment.

What is claimed is:

1. A method of producing a transparent coating on a substrate, said method comprising:
    (a) providing a transparent electrically conductive layer of an oxide of cadmium, doped if necessary to increase its electrical conductivity, on a substrate;
    (b) providing an aluminum layer on said transparent conductive layer of cadmium oxide and, if desired, providing one or more layers of another metal(s) on said layer of aluminum; and
    (c) then electrolytically converting said aluminum layer into a layer of aluminum oxide and if present, said layer(s) of said other metal(s) into oxides of said other metal(s).

2. A method as claimed in claim 1, characterized in that the optional other metal layer(s) consist(s) of niobium and/or tantalum.

3. A substrate having a composition of transparent layers obtained by means of the method as claimed in claim 2.

4. A substrate having a composition of transparent layers obtained by means of the method as claimed in claim 1.

* * * * *